US010723391B2

United States Patent
Saeki et al.

(10) Patent No.: US 10,723,391 B2
(45) Date of Patent: Jul. 28, 2020

(54) VEHICLE SIDE STRUCTURE

(71) Applicant: TOYOTA JIDOSHA KABUSHIKI KAISHA, Toyota-shi, Aichi-ken (JP)

(72) Inventors: Koji Saeki, Okazaki (JP); Keiichi Oka, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 84 days.

(21) Appl. No.: 16/182,749

(22) Filed: Nov. 7, 2018

(65) Prior Publication Data

US 2019/0144046 A1 May 16, 2019

(30) Foreign Application Priority Data

Nov. 15, 2017 (JP) ................. 2017-219752

(51) Int. Cl.
*B62D 25/20* (2006.01)
*B62D 27/02* (2006.01)
*B60N 2/015* (2006.01)

(52) U.S. Cl.
CPC ......... *B62D 25/2036* (2013.01); *B60N 2/015* (2013.01); *B62D 27/02* (2013.01)

(58) Field of Classification Search
CPC ..... B62D 25/2036; B62D 27/02; B60N 2/015
USPC ....................................................... 296/204
See application file for complete search history.

(56) References Cited

U.S. PATENT DOCUMENTS

| 2,597,837 | A | * | 5/1952 | Lindsay | ................. | B62D 23/00 |
| | | | | | | 296/181.4 |
| 2010/0237659 | A1 | * | 9/2010 | Ishigame | ............. | B62D 21/157 |
| | | | | | | 296/204 |
| 2013/0320713 | A1 | * | 12/2013 | Iwamoto | .................. | B60N 2/06 |
| | | | | | | 296/193.07 |
| 2014/0145468 | A1 | * | 5/2014 | Takizawa | ............. | B62D 21/157 |
| | | | | | | 296/187.12 |
| 2016/0001822 | A1 | * | 1/2016 | Cao | ........................ | B62D 25/20 |
| | | | | | | 296/193.07 |
| 2016/0159402 | A1 | * | 6/2016 | Nakaya | .................. | B62D 25/20 |
| | | | | | | 296/193.02 |
| 2017/0036629 | A1 | * | 2/2017 | Ishizaki | ............. | B62D 25/2036 |
| 2017/0057549 | A1 | * | 3/2017 | Saeki | ................. | B62D 25/2036 |
| 2017/0106906 | A1 | * | 4/2017 | Onishi | ............... | B62D 25/2036 |
| 2017/0144711 | A1 | * | 5/2017 | Daigaku | ................ | B62D 21/02 |
| 2018/0065679 | A1 | * | 3/2018 | Johnson | ............ | B62D 25/2036 |
| 2019/0009832 | A1 | * | 1/2019 | Kageyama | ............. | B60N 2/015 |

FOREIGN PATENT DOCUMENTS

JP    2009-126419 A    6/2009

* cited by examiner

*Primary Examiner* — Pinel E Romain
(74) *Attorney, Agent, or Firm* — Oliff PLC (57) ABSTRACT

An L-shape retainer serving as a reinforcement member is provided at attachment locations of a front seat bracket and a rear seat bracket on a rocker and a floor pan. The L-shape retainer has a second side flange joined to an inner side wall of the rocker at an opposite side from a first side flange with a floor plate portion of the floor pan therebetween, and a first floor side flange connected to the second side flange and joined to the floor plate portion of the floor pan.

3 Claims, 10 Drawing Sheets

VEHICLE SIDE STRUCTURE

CROSS REFERENCE TO RELATED APPLICATION

The disclosure of Japanese Patent Application No. 2017-219752 filed on Nov. 15, 2017, including the specification, claims, drawings, and abstract, is incorporated herein by reference in its entirety.

TECHNICAL FIELD

The present disclosure relates to a vehicle side structure, and in particular to a vehicle side structure around a seat attachment portion.

BACKGROUND

On sides of a vehicle, a pair of rockers which are skeleton members extend in a front-and-rear direction. A floor pan which forms a floor plate panel of a cabin is supported between the pair of the rockers. As exemplified in FIG. 8, on an outer end, in a width direction of the vehicle, of a floor pan 100, a flange 102 is formed. The flange 102 is joined to a side wall 112 (inner side wall) at an inner side, in the vehicle width direction, of a rocker 110.

Figure 8:
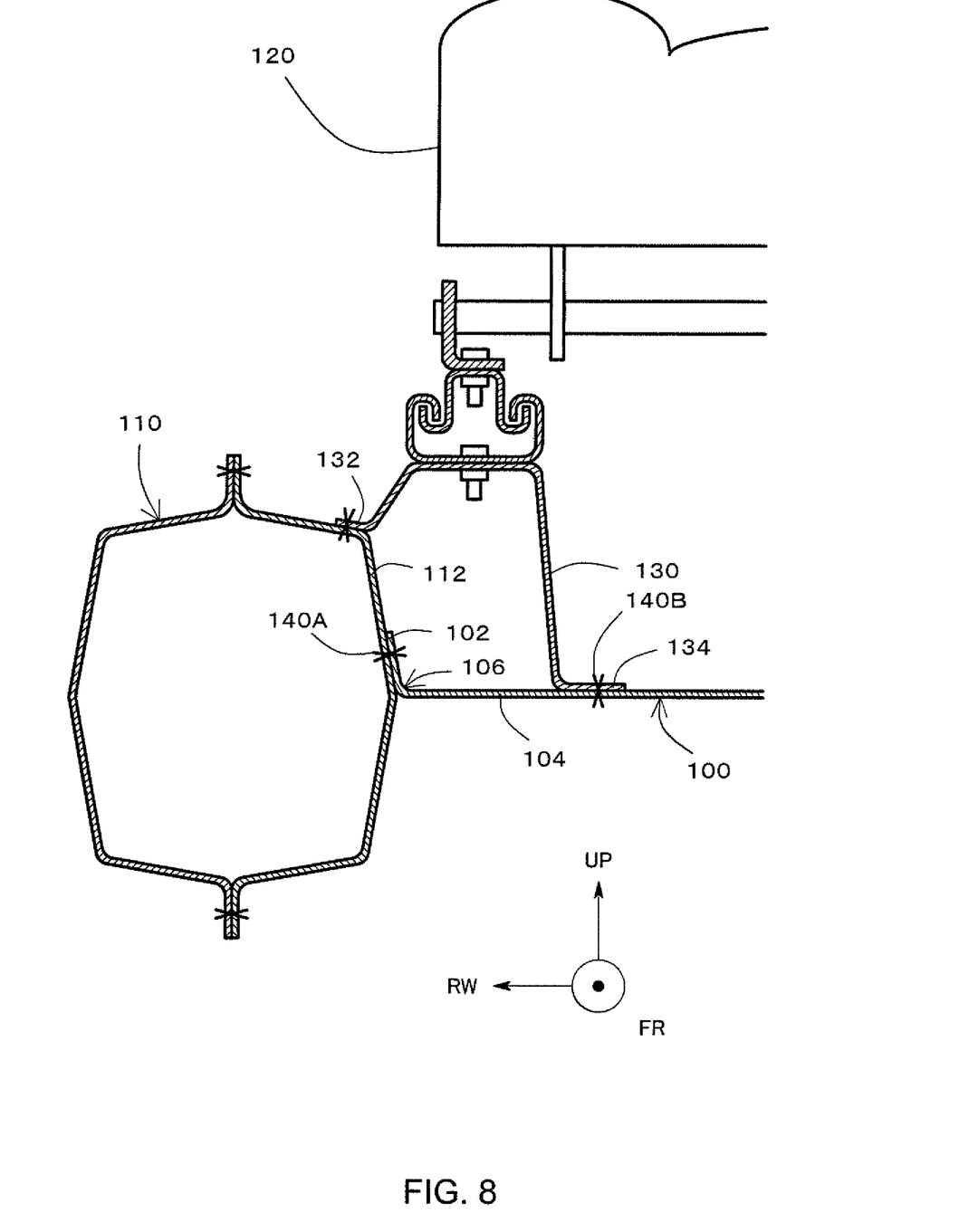
FIG. 8 is a front cross sectional diagram showing a vehicle side structure according to related art.

For attaching a seat 120 in the cabin, a seat bracket 130 which is a support member is used. For example, JP 2009-126419 A discloses a structure in which the seat bracket 130 is joined across both the rocker 110 and the floor pan 100. Specifically, as shown in FIG. 8, a flange 132 provided at an outer end, in the vehicle width direction, of the seat bracket 130 is joined to the rocker 110. In addition, a flange 134 provided at an inner end, in the vehicle width direction, of the seat bracket 130 is joined to a floor plate portion 104 of the floor pan 100.

During traveling on an uneven surface such as a rough road, a load in an up-and-down direction is input from the seat to the seat bracket. During cornering, a load in a width direction (lateral direction) is input from the seat to the seat bracket.

Figure 9:
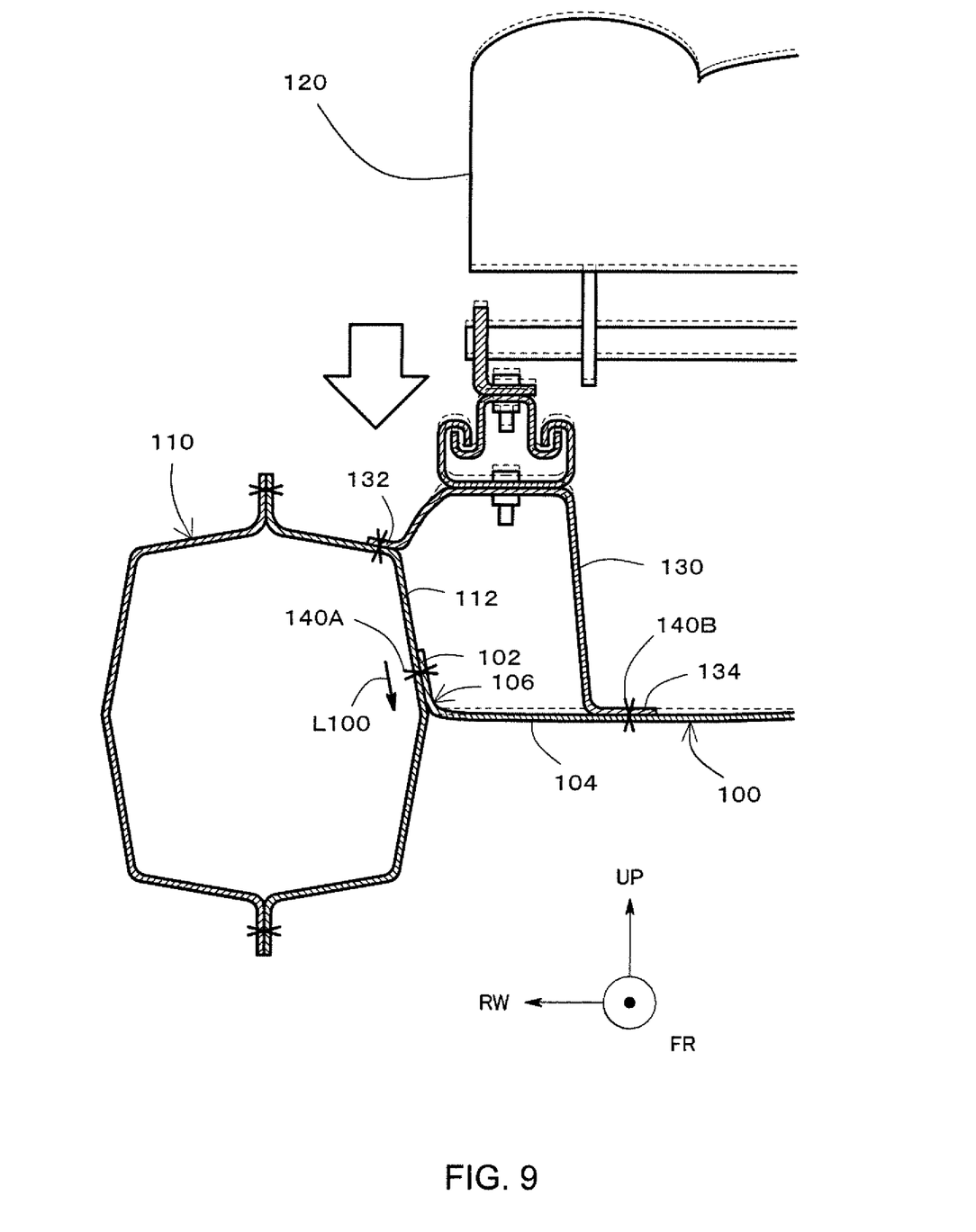
FIG. 9 is a front cross sectional diagram of a vehicle side structure according to related art, showing a case when a downward load is input from a seat to a seat bracket.

FIG. 9 shows, as an example of the former (input of an up-and-down direction load), input of a load in a downward direction shown by a solid-white arrow to the seat bracket 130. By the seat bracket 130 being urged downward, a bent portion 106 of the flange 102 and a floor plate portion 104 is unfolded (becomes a bending center), and the floor pan 100 is deflected downward (sinks). Due to this deflection, the seat 120 is shaken upward and downward. In addition, a shearing load L100 is input to a joint point 140A of the flange 102 of the floor pan 100, which may result in detachment of the joint.

Figure 10:
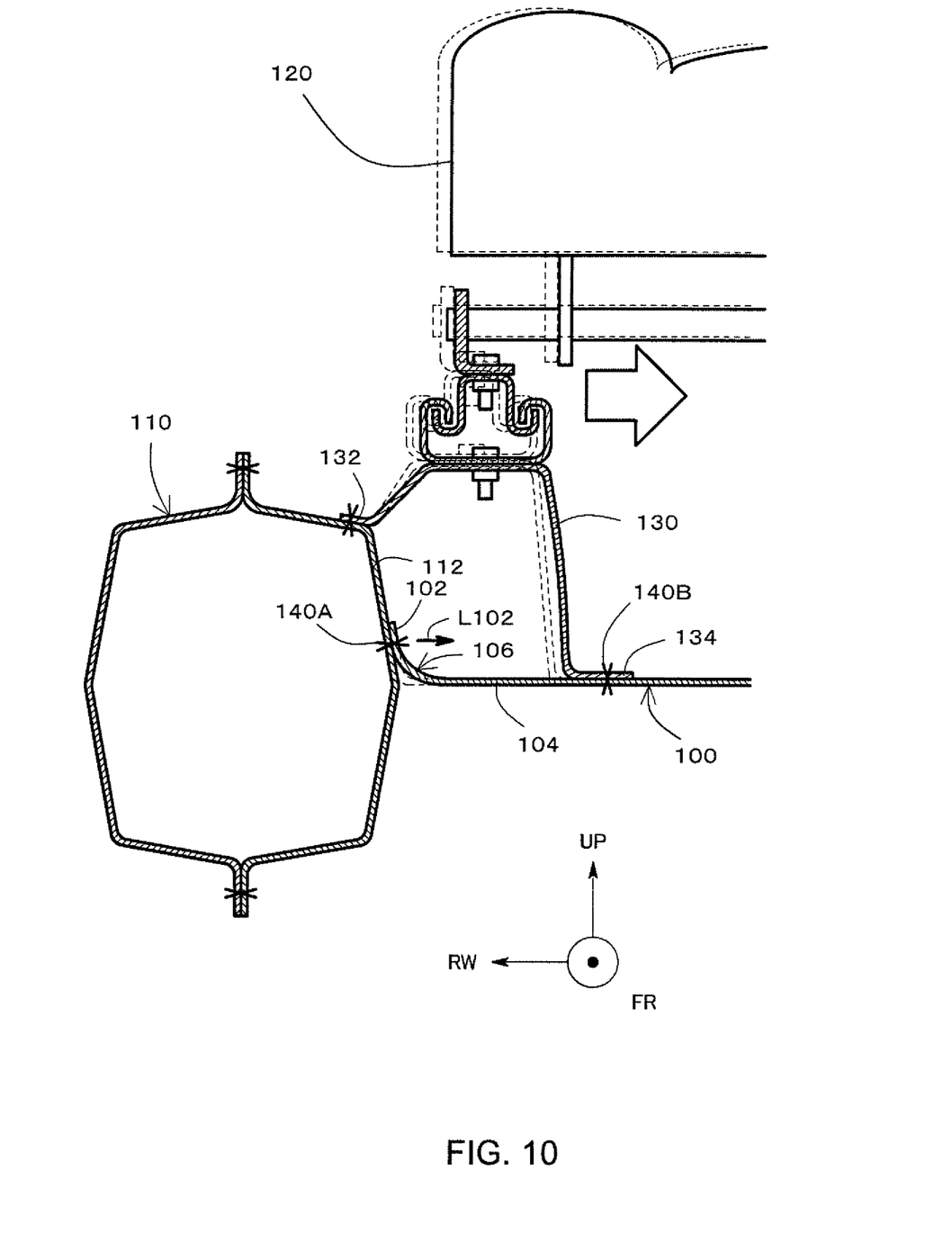
FIG. 10 is a front cross sectional diagram of a vehicle side structure according to related art, showing a case when a load in a width direction (lateral direction) is input from the seat to the seat bracket.

FIG. 10 shows, as an example of the latter (input of a width direction load), input of a load directed toward an inner side in the width direction, shown by a solid-white arrow, to the seat bracket 130. Because the seat bracket 130 is pulled toward the inner side in the width direction, the floor pan 100 is pulled toward the inner side in the width direction via a joint point 140B with the flange 134. Due to this pulling, the bent portion 106 of the floor pan 100 is unfolded (expanded), and the floor pan 100 is shifted toward the inner side in the width direction. Due to the shift, the seat 120 is shaken in the width direction. In addition, a pulling load L102 is input to the joint point 140A of the flange 102 of the floor pan 100, which may result in detachment of the joint.

An advantage of the present disclosure lies in provision of a vehicle side structure which can suppress shaking of the seat due to deformation of the floor pan and detachment of the joint point between the floor pan and the rocker to a larger degree as compared to the related art.

SUMMARY

According to one aspect of the present disclosure, there is provided a vehicle side structure. The side structure is provided with a rocker, a floor pan, a seat bracket, and a reinforcement member. The rocker extends in a front-and-rear direction of the vehicle. The floor pan comprises a floor plate portion which forms a floor surface of a cabin, and a first side flange which is provided at an outer end, in a width direction of the vehicle, of the floor plate portion and joined to a side wall at an inner side, in the width direction of the vehicle, of the rocker. The seat bracket is attached to the rocker and the floor pan. The reinforcement member is provided at attachment locations of the seat bracket on the rocker and the floor pan. The reinforcement member comprises a second side flange which is joined to the side wall of the rocker at an opposite side from the first side flange with the floor plate portion of the floor pan therebetween, and a first floor side flange which is connected to the second side flange and joined to the floor plate portion of the floor pan.

According to the above-described structure, in addition to the first side flange of the floor pan being joined to the side wall of the rocker, the second side flange of the reinforcement member is joined to the side wall of the rocker. Because the reinforcement member is also joined to the floor pan by the first floor side flange, with the use of the reinforcement member, a number of joints connecting the floor pan and the rocker is increased as compared to the related art. With the increase in the number of joint points, a load which is input per joint point (shearing load, pulling load) is dispersed (reduced), and the detachment of the joint is suppressed.

In addition, the reinforcement member is joined to the side wall of the rocker by placing the second side flange at the opposite side from the first side flange with the floor plate portion of the floor pan therebetween, and the first floor side flange connected to the second side wall flange is joined to the floor plate portion of the floor pan. With such a structure, a bending rigidity of a bent portion of the floor pan forming a boundary between the first side flange and the floor plate portion is improved, and, as a result, shaking of the seat due to the unfolding of the bent portion can be suppressed to a larger degree as compared to the related art.

According to another aspect of the present disclosure, the seat bracket may comprise, on front and rear ends, a third side flange which is joined to the side wall of the rocker and to the second side flange of the reinforcement member, and a second floor side flange which is joined to the floor plate portion of the floor pan and to the first floor side flange of the reinforcement member.

According to the above-described structure, the reinforcement member is interposed in the joint between the rocker and the seat bracket, and in the joint between the floor pan and the seat bracket, and thus, the rigidity around the joint point is improved, and, as a result, shaking of the seat is suppressed.

According to another aspect of the present disclosure, the vehicle side structure may further comprise a floor cross member that extends in the width direction of the vehicle. In this case, the reinforcement member extends along the rocker to cross the floor cross member. In addition, on an outer end, in the width direction of the vehicle, of the floor cross member, there are provided a fourth side flange which is joined to the side wall of the rocker and to the second side flange of the reinforcement member and a third floor side flange which is joined to the floor plate portion of the floor pan and to the first floor side flange of the reinforcement member.

The reinforcement member is interposed in the joint between the floor cross member and the rocker and in the joint between the floor cross member and the floor pan, so that the rigidity around the joint point is improved, displacement of the floor cross member is suppressed, and a body rigidity is improved.

ADVANTAGEOUS EFFECTS OF INVENTION

According to the present disclosure, shaking of the seat and detachment of the joint point between the floor pan and the rocker can be suppressed to a larger degree as compared to the related art.

BRIEF DESCRIPTION OF DRAWINGS

Embodiment(s) of the present disclosure will be described by reference to the following figures, wherein.

DESCRIPTION OF EMBODIMENTS

Figure 1:
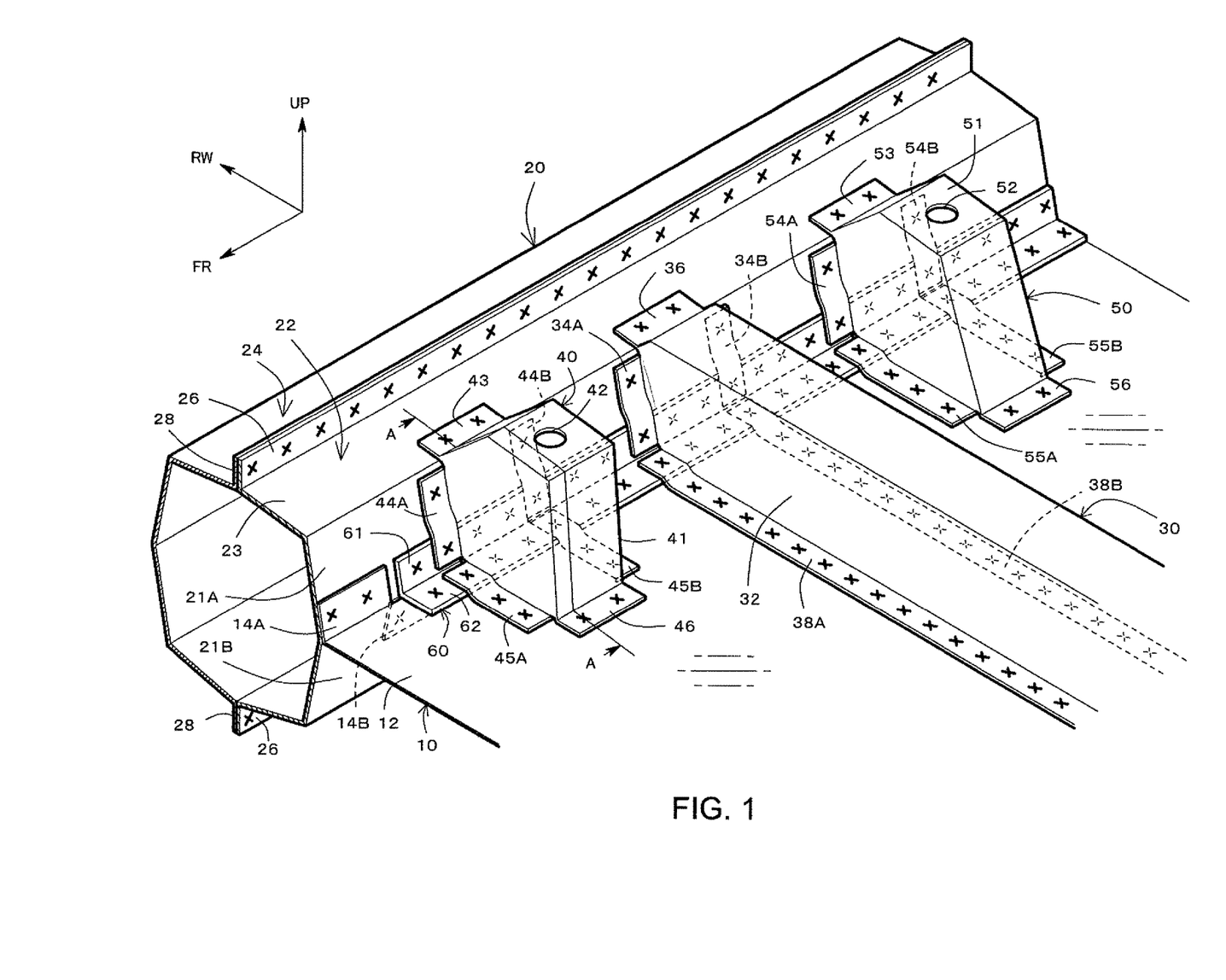
FIG. 1 is a perspective view exemplifying a vehicle side structure according to an embodiment of the present disclosure.

FIG. 1 is a perspective diagram exemplifying a vehicle side structure according to an embodiment of the present disclosure. In FIGS. 1~7, because of a symmetric property of the vehicle structure, only a right side of the vehicle is shown, but the left side of the vehicle has a similar structure.

In FIGS. 1~7, a front-and-rear direction of the vehicle is shown by an axis represented by a reference sign FR, a width direction of the vehicle (hereinafter also simply referred to as a "width direction") is shown by an axis represented by a reference sign RW, and a vertical direction is shown by an axis represented by a reference sign UP. The reference sign FR is an abbreviation of "front", and the front-and-rear direction axis FR has a front side of the vehicle as a positive direction. The reference sign RW is an abbreviation for "right width", and the width direction axis RW has a right width direction as a positive direction. The height axis UP has the upward direction as a positive direction.

As shown in FIG. 1, the FR axis, the RW axis, and the UP axis are orthogonal to each other. In the following, in describing the vehicle side structure of the present embodiment, the structure will be described with reference to these three axes. For example, a "front end" refers to an end of an arbitrary member on the positive direction side of the FR axis, and a "rear end" refers to an end of an arbitrary member on the negative direction side of the FR axis. A "width inner side" refers to a relative inner side of the vehicle in the width reaction along the RW axis, and a "width outer side" refers to a relative outer side of the vehicle in the width direction along the RW axis. An "upper side" refers to a relative positive direction side along the UP axis, and a "lower side" refers to a relative negative direction side along the UP axis.

The vehicle side structure according to the present embodiment comprises a floor pan 10, a rocker 20, a floor cross member 30, a front seat bracket 40, a rear seat bracket 50, and an L-shape retainer 60.

Figure 2:
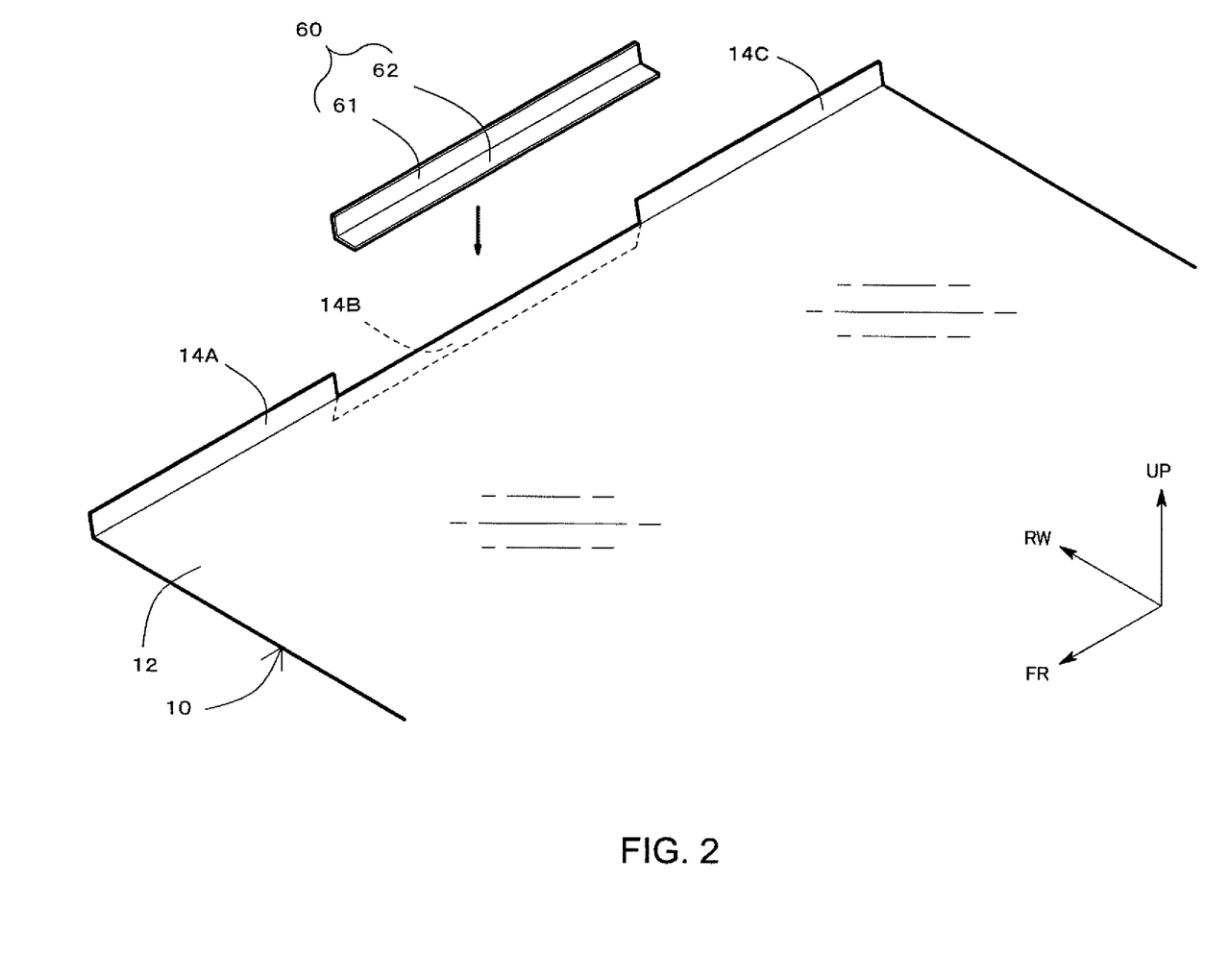
FIG. 2 is a perspective view exemplifying a floor pan and an L-shape retainer according to an embodiment of the present disclosure.
Figure 6:
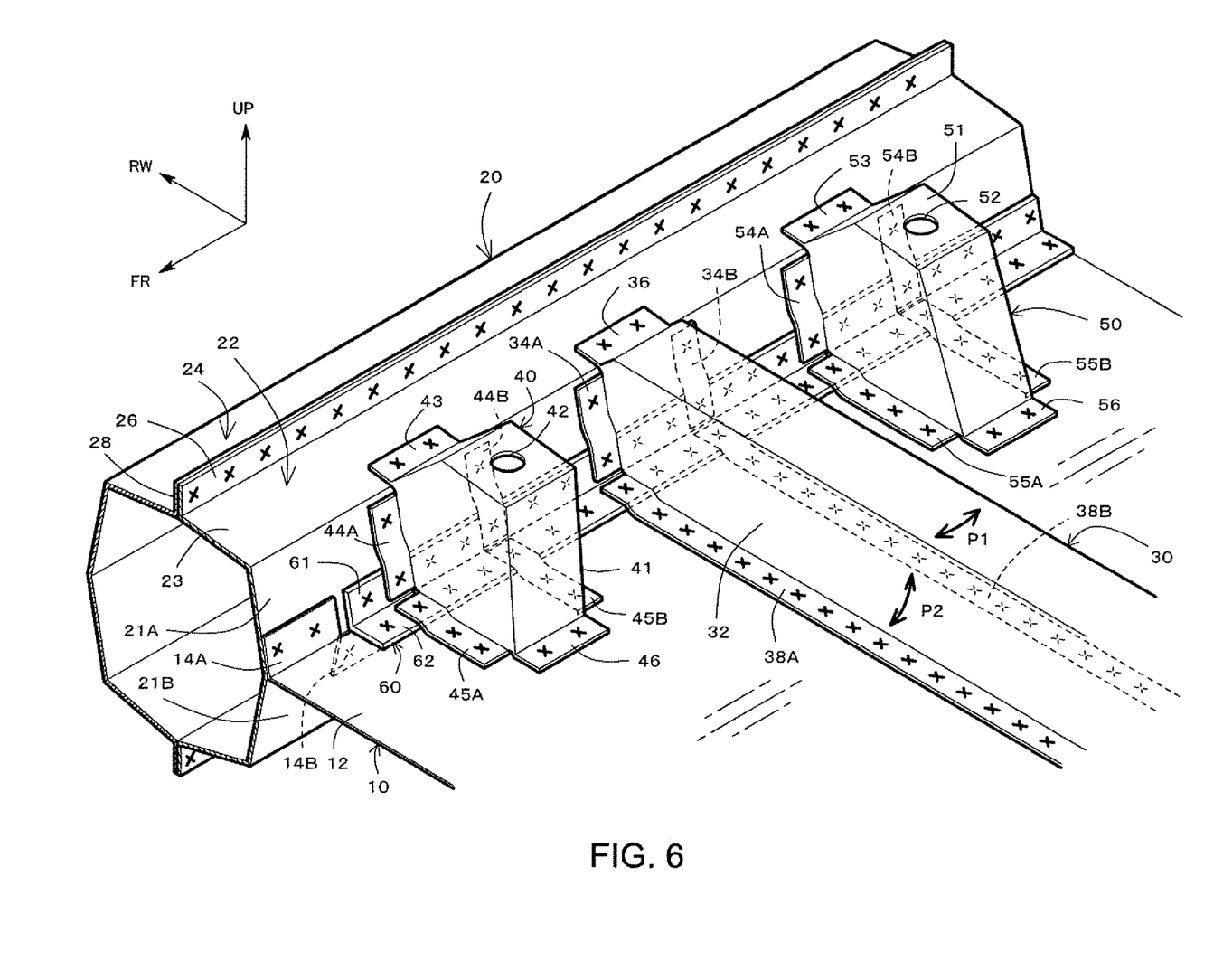
FIG. 6 is a perspective view explaining a rigidity improvement effect of a floor cross member.

As exemplified in FIGS. 1 and 2, the floor pan 10 is a floor plate panel of a cabin, and is formed from, for example, an aluminum plate member having a thickness of about 0.65 mm. The floor pan 10 comprises a floor plate portion 12 forming a floor surface of the cabin, and first side flanges 14A, 14B, and 14C. The first side flanges 14A, 14B, and 14C are provided at an outer end, in the width direction, of the floor plate portion 12. In FIGS. 1, 2, and 6, in showing the floor plate portion 12, uneven shapes such as reinforcement beads are not shown, and only a general surface forming a reference surface for the depth of the beads or the like is shown.

As exemplified in FIG. 2, the first side flanges 14A, 14B, and 14C are bent with respect to a plane of extension of the floor plate portion 12 (RW-FR plane). Specifically, the first side flanges 14A and 14C are bent (folded) upward from the floor plate portion 12, and the first side flange 14B is bent downward from the floor plate portion 12.

As shown in FIG. 1, the first side flange 14B is provided at a location where the front seat bracket 40, the floor cross member 30, and the rear seat bracket 50 are attached. As will be described later, the L-shape retainer 60 is placed at this location. That is, the L-shape retainer 60 is interposed between the floor pan 10 and the rocker 20, and the front seat bracket 40, the floor cross member 30, and the rear seat bracket 50. A length, in the front-and-rear direction, of the first side flange 14B may be determined to be approximately equal to a length, in the front-and-rear direction, of the L-shape retainer 60 or longer than that of the L-shape retainer 60.

The rocker 20 is a skeleton member which extends in the front-and-rear direction of the vehicle. The rocker 20 is provided, for example, on side ends of the cabin region of the vehicle. FIG. 1 shows the rocker 20 at the right side end. For example, the rocker 20 is formed including an inner member 22 provided at a relatively inner side in the width direction and an outer member 24 provided at a relatively outer side in the width direction. By flanges 26 provided at upper and lower ends of the inner member 22 and flanges 28 provided at upper and lower ends of the outer member 24 being joined with each other, a closed cross sectional structure is formed for the rocker 20.

In FIGS. 1~7, an "X" shows a joint point. The joint point may be a welding point, and is, for example, a welding point by laser screw welding.

The floor cross member 30 is a skeleton member which extends in the width direction. The floor cross member 30 is provided, for example, between the front seat bracket 40 and the rear seat bracket 50 along the front-and-rear direction.

The floor cross member 30 is formed, for example, in a hat shape opened downward, and a closed cross sectional structure is formed by closing the downward opening by the floor plate portion 12 of the floor pan 10. The floor cross member 30 comprises a cross body portion 32 which extends in the width direction, and a plurality of flanges which extend from the cross body portion 32.

As the flanges, the floor cross member 30 comprises fourth side flanges 34A and 34B which respectively extend in the front-and-rear direction at outer ends, in the width direction, of the cross body portion 32. The floor cross member 30 further comprises a second upper surface flange 36 which extends in a manner to overlap an upper wall 23 of the rocker 20. Further, at a lower end of the cross body portion 32, third floor side flanges 38A and 38B which correspond to a brim of the hat shape described above are provided, extending in the front-and-rear direction of the cross body portion 32. The third floor side flanges 38A and 38B extend to the outer ends, in the width direction, of the cross body portion 32.

Figure 3:
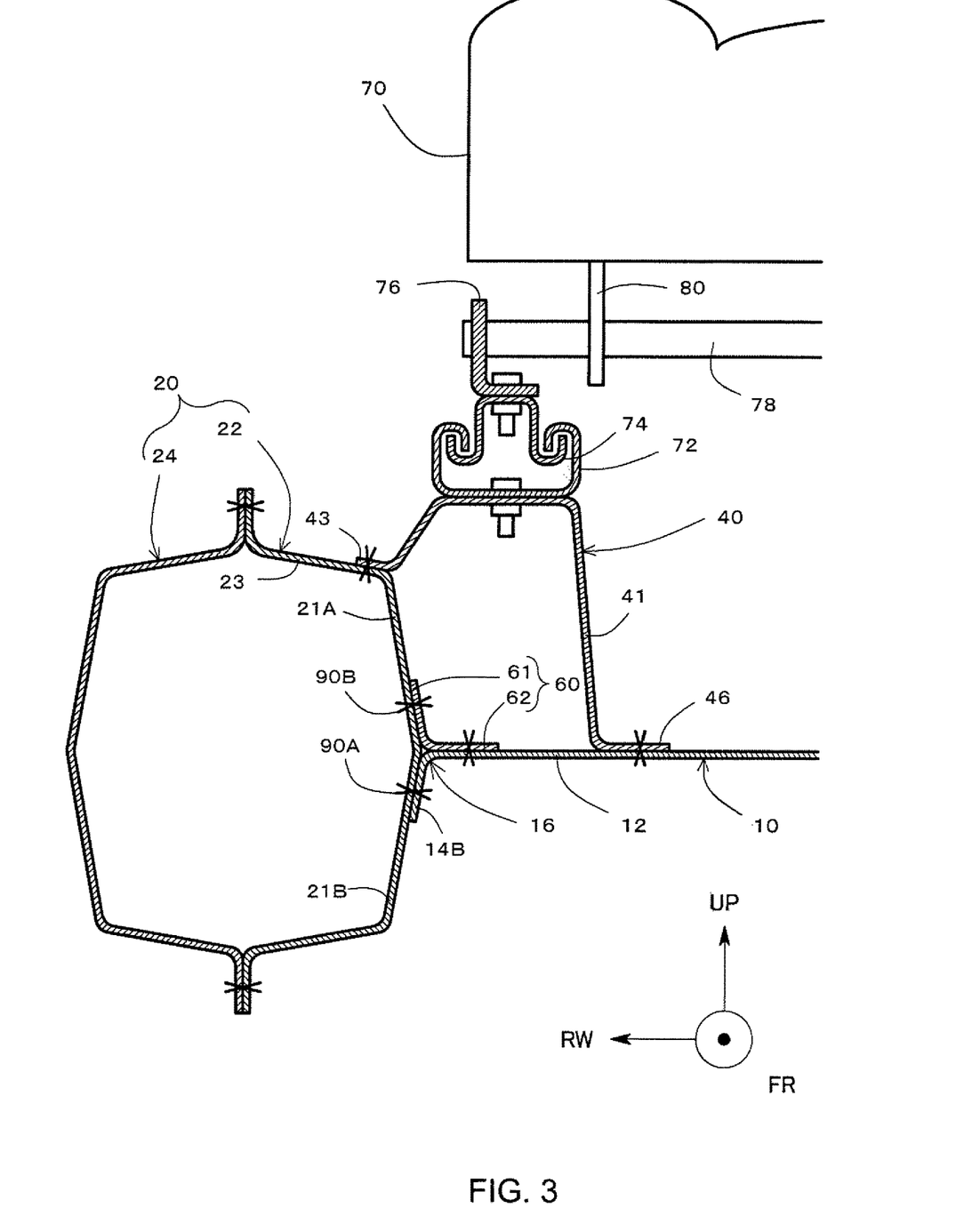
FIG. 3 is an A-A cross sectional diagram of FIG. 1.

The front seat bracket 40 and the rear seat bracket 50 are support members which support a seat 70 on the upper sides thereof (refer to FIG. 3). As will be described later, the front seat bracket 40 and the rear seat bracket 50 are attached to the rocker 20 and the floor pan 10.

The front seat bracket 40 and the rear seat bracket 50 have basically the same structure, although there is a slight difference such as that the latter has a relatively larger size in the width direction. In the following, the front seat bracket 40 will be described, but the rear seat bracket 50 has a similar structure. Specifically, unless otherwise noted, in the following, the description is applicable to the rear seat bracket 50 by switching the number in the tens digit of the reference numerals from 4 to 5.

FIG. 3 exemplifies an A-A cross section (front cross sectional diagram) of FIG. 1. As shown in FIGS. 1 and 3, the front seat bracket 40 comprises a bracket body portion 41, and a plurality of flanges extending from the bracket body portion 41. The bracket body portion 41 is supported by the floor pan 10, the rocker 20, and the L-shape retainer 60 via the flanges thereof.

The bracket body portion 41 has an approximate box shape, and is opened with respect to the rocker 20 and the floor pan 10. In other words, the opening of the bracket body portion 41 is closed by the rocker 20 and the floor pan 10.

An upper surface of the bracket body portion 41 extends along an approximate horizontal plane; that is, the FR-RW plane. A bolt hole 42 is formed on the upper surface. A fixed rail 72 for movement of the seat 70 is placed on the upper surface of the bracket body portion 41, a bolt hole of the fixed rail 72 (not shown) and the bolt hole 42 of the bracket body portion 41 are aligned, and the members are fixed by a bolt. A front part of the fixed rail 72 is fastened to the front seat bracket 40, and a rear part of the fixed rail 72 is fastened to the rear seat bracket 50. In addition, a movable rail 74 is slidable with respect to the fixed rail 72.

A leg 76 is fastened to an upper part of the movable rail 74 by bolt-fixing or the like. A support pipe 78 extends in a width direction from an upper end of the leg 76. The seat 70 is supported from the support pipe 78 via an arm 80.

Referring again to FIG. 1, a plurality of flanges extend from the bracket body portion 41. At outer ends, in the width direction, of the bracket body portion 41, a first upper surface flange 43, and third side flanges 44A and 44B are provided. The first upper surface flange 43 is formed to extend from the outer end, in the width direction, of the bracket body portion 41 over the upper wall 23 of the rocker 20. The third side flanges 44A and 44B are provided to respectively extend in the front-and-rear direction from the outer ends, in the width direction, of the front and rear surfaces of the bracket body portion 41.

In addition, second floor side flanges 45A and 45B and an inner flange 46 extend from a lower end of the bracket body portion 41. The second floor side flanges 45A and 45B are provided to respectively extend in the front-and-rear direction from the lower ends of the front and rear surfaces of the bracket body portion 41. The inner flange 46 is provided to extend further toward an inner side in the width direction from the lower end of the inner side surface, in the width direction, of the bracket body portion 41.

The L-shape retainer 60 is a reinforcement member having an L shape in front view, and extends in the front-and-rear direction. The L-shape retainer 60 is provided at attachment locations, on the rocker 20 and the floor pan 10, of the front seat bracket 40 and the rear seat bracket 50.

For example, the L-shape retainer 60 may be thicker than the floor pan 10. For example, the thickness of the L-shape retainer 60 may be about 1.2 mm. In addition, the L-shape retainer 60 is formed from, for example, an aluminum plate member.

The L-shape retainer 60 comprises a second side flange 61 and a first floor side flange 62. The second side flange 60 extends relatively upward. The first floor side flange 62 is connected to the second side flange 61, and is arranged in a relatively laid-down manner in the width direction. The second side flange 61 and the first floor side flange 62 both extend in the front-and-rear direction, and extend, for example, to cross the front seat bracket 40, the floor cross member 30, and the rear seat bracket 50 along the rocker 20.

<Joint Point>

With reference to FIGS. 1 and 3, a joint relationship between the constituent elements of the vehicle side structure according to the present embodiment will now be described. First, for the joint to the floor pan 10, the L-shape retainer 60 serving as the reinforcement member is joined to the floor pan 10. Specifically, the first floor side flange 62 of the L-shape retainer 60 is joined to a location, of the outer members, in the width direction, of the floor plate portion 12 of the floor pan 10, corresponding to the first side flange 14B.

Further, as shown in FIG. 3, the first side flange 14B, of the floor pan 10, which is bent downward, is joined to an inner side wall 21B of the rocker 20. In addition, the second side flange 61, of the L-shape retainer 60, which is bent upward, is joined to an inner side wall 21A of the rocker 20.

In this manner, the second side flange 61 of the L-shape retainer 60 is joined to the inner side wall 21A of the rocker 20 at an opposite side from the first side flange 14B of the floor pan 10 with the floor plate portion 12 of the floor pan 10 therebetween, so that the floor pan 10 and the rocker 20 are two-point joined in the up-and-down direction via the L-shape retainer 60.

In addition, the first side flanges 14A and 14C of the floor pan 10 are joined to the inner side wall 21A of the rocker 20.

The second upper surface flange 36 of the floor cross member 30 is joined to the upper wall 23 provided on the inner member 22 of the rocker 20. Furthermore, the fourth side flanges 34A and 34B of the floor cross member 30 are joined to the inner side wall 21A of the rocker 20 and the second side flange 61 of the L-shape retainer 60. Specifically, as exemplified in FIG. 1, lower ends of the fourth side flanges 34A and 34B of the floor cross member 30 overlap the second side flange 61 of the L-shape retainer 60 and the inner side wall 21A of the rocker 20. The overlapped portions of these three members are joined by welding or the like.

The third floor side flanges 38A and 38B of the floor cross member 30 are joined to the floor plate portion 12 of the floor pan 10 and the first floor side flange 62 of the L-shape retainer 60. Specifically, as exemplified in FIG. 1, outer ends, in the width direction, of the third floor side flanges 38A and 38B of the floor cross member 30 overlap the first floor side flange 62 of the L-shape retainer 60 and the outer end, in the width direction, of the floor plate portion 12 of the floor pan 10. The overlapped portions of these three members are joined by welding or the like.

Next, with regard to the front seat bracket 40 (and similarly, the rear seat bracket 50), the first upper surface flange 43 of the front seat bracket 40 is joined to the upper wall 23 of the rocker 20. Further, the third side flanges 44A and 44B of the front seat bracket 40 are joined to the inner side wall 21A of the rocker 20 and the second side flange 61 of the L-shape retainer 60. Specifically, as exemplified in FIG. 1, lower ends of the third side flanges 44A and 44B of the front seat bracket 40 overlap the second side flange 61 of the L-shape retainer 60 and the inner side wall 21A of the rocker 20. The overlapped portions of these three members are joined by welding or the like.

The second floor side flanges 45A and 45B of the front seat bracket 40 are joined to the floor plate portion 12 of the floor pan 10 and the first floor side flange 62 of the L-shape retainer 60. Specifically, as exemplified in FIG. 1, outer ends, in the width direction, of the second floor side flanges 45A and 45B of the front seat bracket 40 overlap the first floor side flange 62 of the L-shape retainer 60 and the outer end, in the width direction, of the floor plate portion 12 of the floor pan 10. The overlapped portions of these three members are joined by welding or the like.

In this manner, by interposing the L-shape retainer 60 serving as the reinforcement member in the joint between the rocker 20 and the front seat bracket 40, and in the joint between the floor pan 10 and the front seat bracket 40, it becomes possible to improve the rigidity around the joint point, and, as a result, the shaking of the seat 70 can be suppressed.

<Behavior Upon Input of Load>

Figure 4:
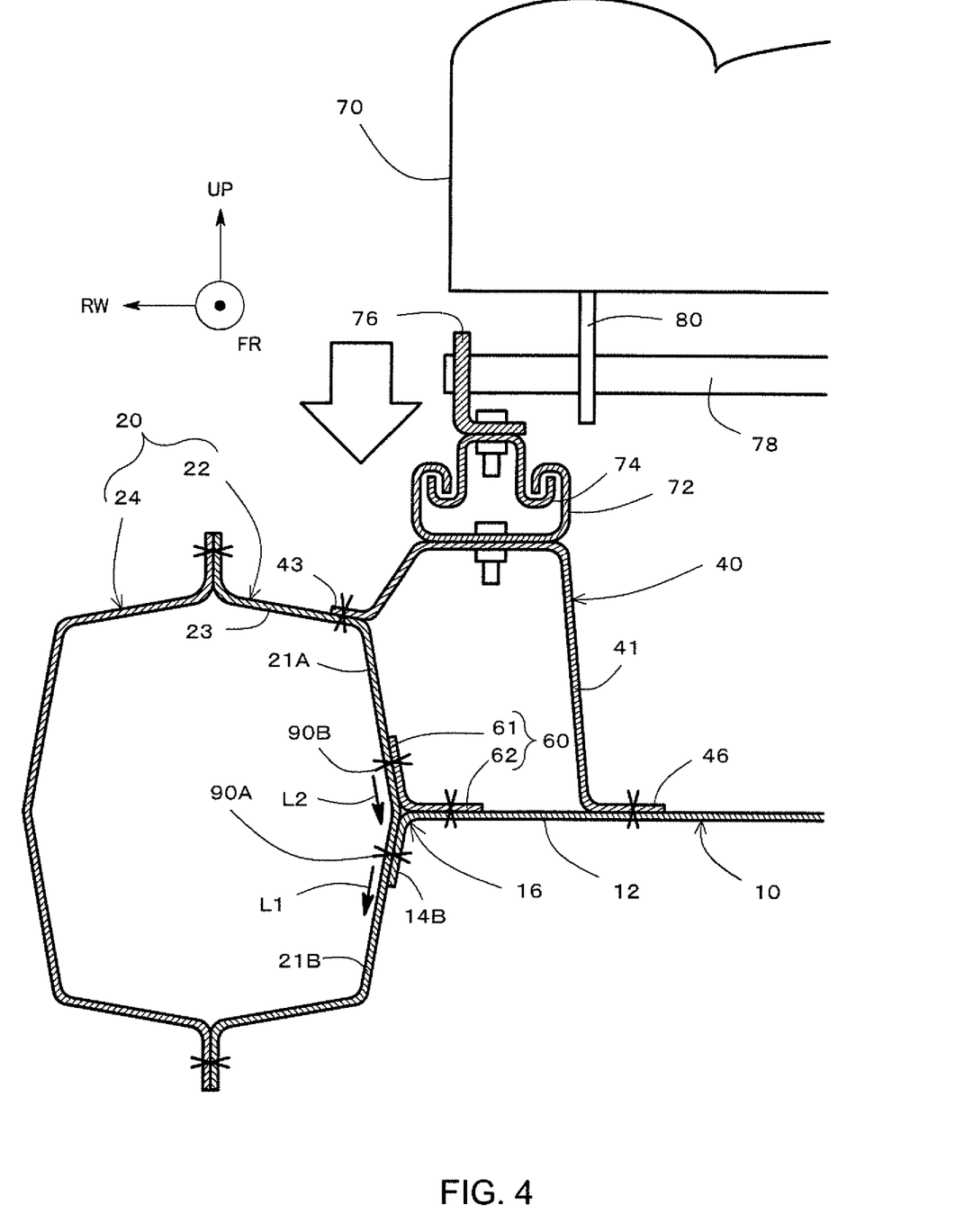
FIG. 4 is an A-A cross sectional diagram when a downward load is input from a seat to a seat bracket.

FIG. 4 exemplifies a behavior when a downward load as shown by a solid-white arrow is input from the seat 70 to the front seat bracket 40. Such an input of the load may occur when the vehicle is traveling on an uneven road surface such as a rough road.

With the input of the downward load, the floor plate portion 12 of the floor pan 10 is pressed downward from the inner flange 46 of the front seat bracket 40. In this process, because a bent portion 16, which is a boundary between the floor plate portion 12 of the floor pan 10 and the first side flange 14B, and which would become a starting point of a bending deformation, is reinforced by the L-shape retainer 60, unfolding of the bent portion 16 is suppressed. As a result, sinking of the floor plate portion 12 of the floor pan 10 is suppressed.

In addition, with the input of the downward load on the front seat bracket 40, shearing loads L1 and L2 in the up-and-down direction are input to a joint point 90A between the first side flange 14B of the floor pan 10 and the inner side wall 21B of the rocker 20, and to a joint point 90B between the second side flange 61 of the L-shape retainer 60 and the inner wall 21A of the rocker 20.

In this process, as compared to the structure of the related art; that is, a structure in which the rocker 20 and the floor pan 10 are joined by only one joint point in the front cross sectional view, because the rocker 20 and the floor pan 10 are joined by two joint points 90A and 90B at the upper and lower sections, the shearing load is dispersed. Therefore, the detachment of the joint point by the input of the shearing load can be suppressed to a larger degree as compared to the related art.

Figure 5:
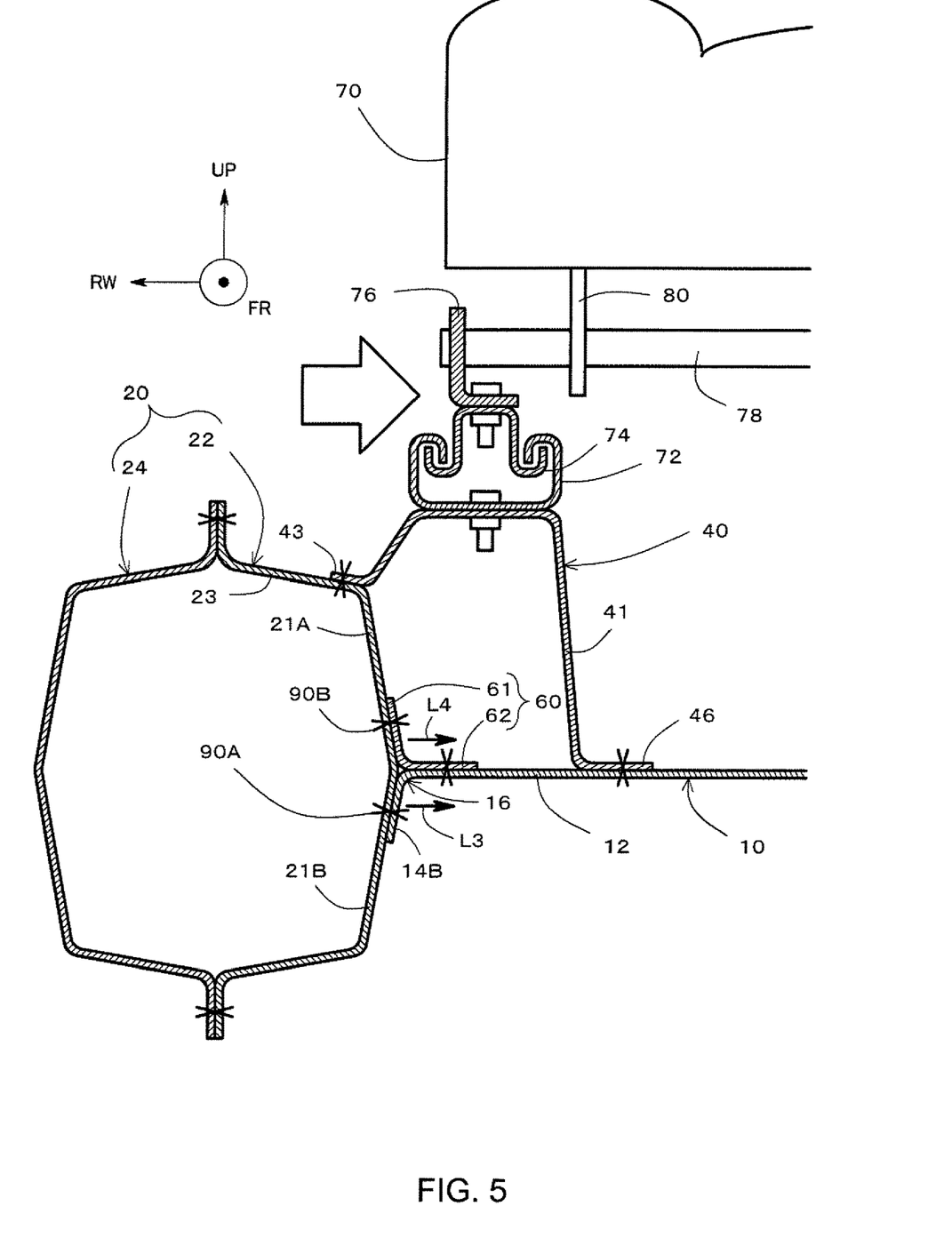
FIG. 5 is an A-A cross sectional diagram when a load in a width direction (lateral direction) is input from the seat to the seat bracket.

FIG. 5 exemplifies a behavior when a load in an inner side in the width direction as shown by a solid-white arrow is input from the seat 70 to the front seat bracket 40. Such an input of the load may occur during cornering of the vehicle at a curved road or the like.

The floor plate portion 12 of the floor pan 10 is pressed toward the inner side in the width direction from the inner flange 46 of the front seat bracket 40. In this case, because the bent portion 16, which is a boundary between the floor plate portion 12 of the floor pan 10 and the first side flange 14B, and which would become a starting point of the bending deformation, is reinforced by the L-shape retainer 60, the unfolding of the bent portion 16 is suppressed. As a result, pulling of the floor plate portion 12 of the floor pan 10 toward the inner side in the width direction is suppressed.

In addition, with the input of the load toward the inner side, in the width direction, on the front seat bracket 40, pulling loads L3 and L4 toward the inner side in the width direction are input to the joint point 90A between the first side flange 14B of the floor pan 10 and the inner side wall 21B of the rocker 20, and to the joint point 90B between the second side flange 61 of the L-shape retainer 60 and the inner side wall 21A of the rocker 20.

In this process, as compared with the structure of the related art; that is, a structure in which the rocker 20 and the floor pan 10 are joined by only one joint point in the front cross sectional view, because the rocker 20 and the floor pan 10 are joined by the two joint points 90A and 90B, the pulling loads are dispersed. Therefore, the detachment of the joint point by the input of the pulling load can be suppressed to a larger degree as compared to the related art.

FIG. 6 exemplifies a perspective view of the vehicle side structure. As described above, the lower ends of the fourth side flanges 34A and 34B of the floor cross member 30 overlap the second side flange 61 of the L-shape retainer 60 and the inner side wall 21A of the rocker 20, and the overlapped portions of these three members are joined by welding or the like. Therefore, the joint location has a higher rigidity (is more resistant to deformation) as compared to a case where the L-shape retainer 60 is not provided.

For example, when a displacement, in the front-and-rear direction, of the floor cross member 30 as shown by an arrow P1 is considered, because the rigidity of the end in the width direction, which corresponds to a root portion thereof, is increased by the L-shape retainer 60, the displacement can be suppressed to a larger degree as compared to the related art; that is, a structure having no L-shape retainer 60.

Similarly, the outer ends, in the width direction, of the third floor side flanges 38A and 38B of the floor cross member 30 overlap the first floor side flange 62 of the L-shape retainer and the outer end, in the width direction, of the floor plate portion 12 of the floor pan 10, and the overlapped portions of these three members are joined by welding or the like. Therefore, the joint location has a higher rigidity (is more resistant to deformation) as compared to the case where the L-shape retainer 60 is not provided.

For example, when a displacement, in the up-and-down direction, of the floor cross member 30 as shown by an arrow P2 is considered, because the rigidity of the end in the width direction, which corresponds to the root portion thereof, is increased by the L-shape retainer 60, the displacement can be suppressed to a larger degree as compared to the related art; that is, a structure having no L-shape retainer 60.

Alternative Configuration of Embodiment

In the embodiment described above, the first side flange 14B of the floor pan 10 is bent downward and the second side flange 61 of the L-shape retainer 60 is bent upward. The present disclosure, however, is not limited to such a configuration. That is, it is sufficient that the first side flange 14B and the second side flanges 61 are provided at upper and lower parts from each other with the floor plate portion 12 of the floor pan 10 therebetween.

Figure 7:
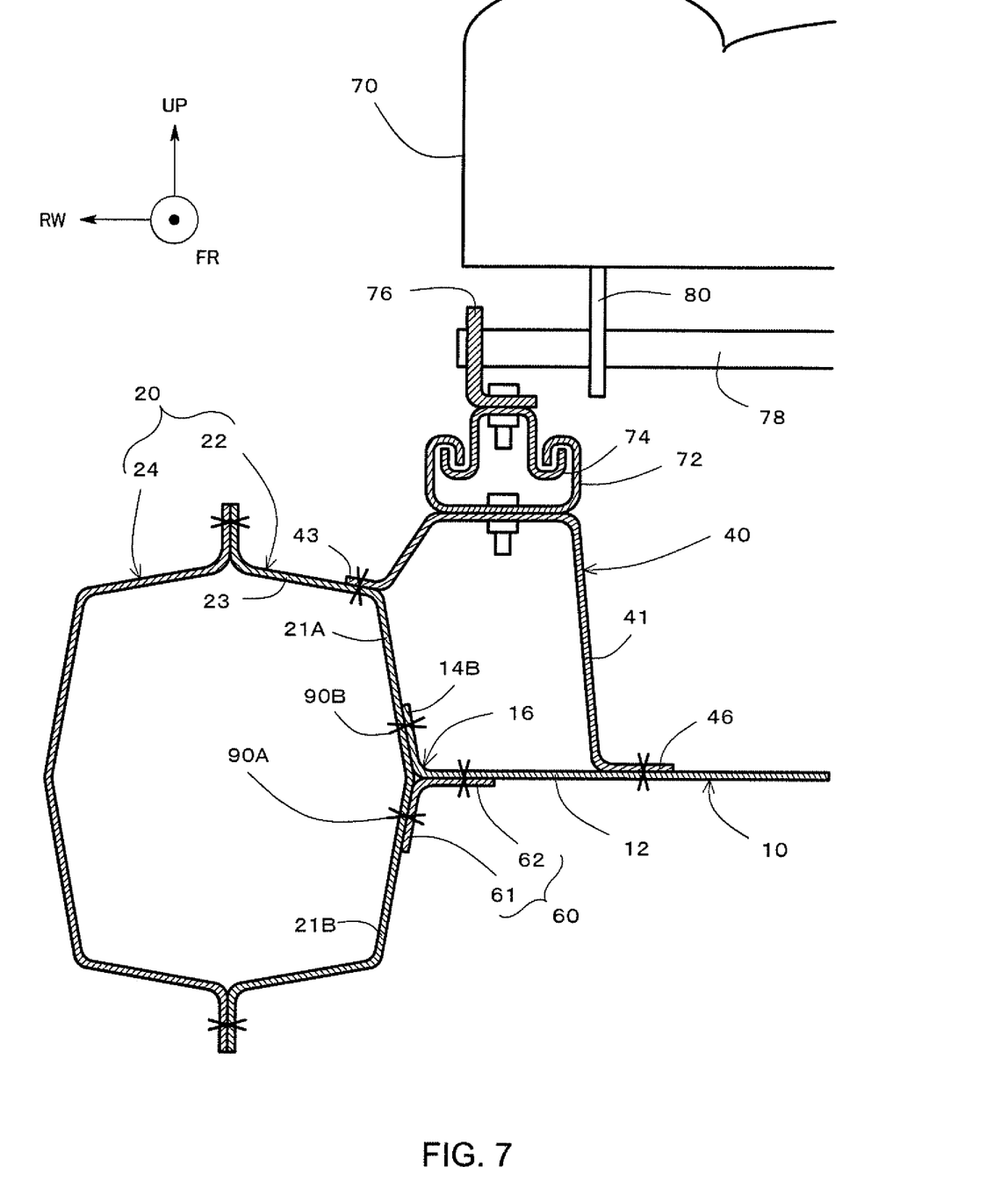
FIG. 7 is a front cross sectional diagram showing a vehicle side structure according to an alternative configuration of an embodiment of the present disclosure.

For example, as exemplified in FIG. 7, the first side flange 14B of the floor pan 10 is folded upward, and the second side flange 61 of the L-shape retainer 60 is folded downward. Further, the first floor side flange 62 of the L-shape retainer 60 is joined from below the floor plate portion 12 of the floor pan 10. The second side flange 61 of the L-shape retainer 60 is joined to the inner side wall 21B of the rocker 20. In addition, the first side flange 14B of the floor pan 10 is joined to the inner side wall 21A of the rocker 20.

With such a configuration also, because the rocker 20 and the floor pan 10 are joined by the two joint points 90A and 90B, the shearing load and the pulling load can be dispersed. In addition, because the bent portion 16 of the floor pan 10 is reinforced by the L-shape retainer 60, the bending deformation of the bent portion 16 is suppressed, and, as a result, shaking of the seat 70 is suppressed.

The present disclosure is not limited to the embodiment described above, and includes all changes and modifications within the scope and spirit of the present disclosure as defined in the claims.

The invention claimed is:

1. A vehicle side structure comprising:
   a rocker that extends in a front-and-rear direction of a vehicle;
   a floor pan having a floor plate portion which forms a floor surface of a cabin, and a first side flange which is provided at an outer end, in a width direction of the vehicle, of the floor plate portion and joined to a side wall at an inner side, in the width direction of the vehicle, of the rocker; and
   a seat bracket attached to the rocker and the floor pan, wherein
   the vehicle side structure further comprises a reinforcement member which is provided at attachment locations of the seat bracket on the rocker and the floor pan, and which includes a second side flange which is joined to the side wall of the rocker at an opposite side from the first side flange with the floor plate portion of the floor pan therebetween, and a first floor side flange which is connected to the second side flange and joined to the floor plate portion of the floor pan.

2. The vehicle side structure according to claim 1, wherein the seat bracket comprises, on front and rear ends, a third side flange which is joined to the side wall of the rocker and to the second side flange of the reinforcement member, and a second floor side flange which is joined to the floor plate portion of the floor pan and to the first floor side flange of the reinforcement member.

3. The vehicle side structure according to claim 1, further comprising:
   a floor cross member that extends in the width direction of the vehicle, wherein
   the reinforcement member extends along the rocker to cross the floor cross member, and
   on an outer end, in the width direction of the vehicle, of the floor cross member, there are provided a fourth side flange which is joined to the side wall of the rocker and to the second side flange of the reinforcement member, and a third floor side flange which is joined to the floor plate portion of the floor pan and to the first floor side flange of the reinforcement member.

* * * * *